United States Patent [19]

Chiao et al.

[11] Patent Number: 6,048,315

[45] Date of Patent: Apr. 11, 2000

[54] METHOD AND APPARATUS FOR ULTRASONIC SYNTHETIC TRANSMIT APERTURE IMAGING USING ORTHOGONAL COMPLEMENTARY CODES

[75] Inventors: Richard Yung Chiao, Clifton Park, N.Y.; Lewis Jones Thomas, III, Tokyo, Japan

[73] Assignee: General Electric Company, Schenectady, N.Y.

[21] Appl. No.: 09/161,362

[22] Filed: Sep. 28, 1998

[51] Int. Cl.$^7$ ........................................ A61B 8/00
[52] U.S. Cl. ........................................ 600/447
[58] Field of Search ..................... 600/437, 443, 600/447, 445–456; 73/625–626

[56] References Cited

U.S. PATENT DOCUMENTS

| | | | |
|---|---|---|---|
| 5,014,712 | 5/1991 | O'Donnell | 600/447 |
| 5,415,173 | 5/1995 | Miwa et al. | 600/447 |
| 5,938,611 | 8/1999 | Muzilla et al. | 600/455 |
| 5,961,463 | 10/1999 | Rhyne et al. | 600/458 |
| 5,964,706 | 10/1999 | Mo et al. | 600/443 |

OTHER PUBLICATIONS

Frank, "Polyphase Complementary Codes", IEEE Trans. Inform. Theory, vol. IT–26, No. 6, Nov. 1980, pp. 641–647.
Sivaswamy, "Multiphase Complementary Codes", IEEE Trans. Inform. Theory, vol. IT–24, No. 5, Sep. 1978, pp. 546–552.
Golay, "Complementary Series," IRE Trans. Inform. Theory, Apr. 1961, pp. 82–87.
Lockwood et al., "Design of Sparse Array Imaging Systems," 1995 IEEE Ultrasonics Symp. Proc., pp. 1237–1243.
Tseng, "Signal Multiplexing in Surface–Wave Delay Lines Using Orthogonal Pairs of Golay's Complementary Sequences," IEEE Trans. Sonics Ultrason., vol. SU–18, No. 2, Apr. 1971, pp. 103–107.
Tseng et al., "Complementary Sets of Sequences," IEEE Trans. Inform. Theory, vol. IT–18, No. 5, Sep. 1972, pp. 644–652.
Takeuchi, "An Investigation of a Spread Energy Method for Medical Ultrasound Systems. I. Theory and Investigation," Ultrasonics, vol. 17, Jul. 1979, pp. 175–182.
Frank, "Multiple Pulse and Phase Code Modulation in the Loran–C System," IRE Trans. Aeronaut. Navig. Electronics, vol. ANE–7, Jun. 1990, pp. 55–61.

Primary Examiner—Francis J. Jaworski
Attorney, Agent, or Firm—Marvin Snyder; Douglas E. Stoner

[57] ABSTRACT

Signal-to-noise ratio in synthetic transmit aperture imaging is significantly increased by encoding the transmit signals in orthogonal complementary codes for multiple point sources to be transmitted simultaneously. A number N of elements of a transducer array are simultaneously activated to transmit unfocused ultrasound waves during each one of N transmit events. For each transmit event, a different set of N code sequences is applied by a controller to N pulsers for the transducers to drive the transducers. The imaging depth is divided into several zones and code lengths are employed which increase with depth. A Hadamard construct of the orthogonal complementary sets, which requires only 2N correlations for decoding, is used.

17 Claims, 4 Drawing Sheets

METHOD AND APPARATUS FOR ULTRASONIC SYNTHETIC TRANSMIT APERTURE IMAGING USING ORTHOGONAL COMPLEMENTARY CODES

FIELD OF THE INVENTION

This invention generally relates to digital ultrasound imaging systems and, in particular, to methods and apparatus for increasing the signal-to-noise ratio (SNR) and apparent acoustic frame rate in ultrasound imaging.

BACKGROUND OF THE INVENTION

A conventional ultrasound imaging system comprises an array of ultrasonic transducer elements which transmit a steered ultrasound beam and then receive the reflected beam from the object being studied. Scanning of the object comprises a series of measurements in which the steered ultrasonic wave is transmitted, the system switches to receive mode after a short time interval, and the reflected ultrasonic wave is received, beamformed and processed for display. Typically, transmission and reception are steered in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages so as to act as transmit elements. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and complex amplitude of the applied voltages, the beam with its focal point can be moved in a plane to scan the object.

The same principles apply when the transducer probe is employed to receive the reflected sound in a receive mode. The voltages produced at the receiving transducer elements are summed so that the net signal at a particular time is indicative of the ultrasound reflected from a single focal point in the object. As with the transmission mode, this focused reception of the ultrasonic energy is achieved by imparting separate time delays (and/or phase shifts) and gains to the signal from each receiving transducer element. The output signals of the beamformer channels are then coherently summed to form a respective pixel intensity value for each sample volume in the object region or volume of interest. These pixel intensity values are log-compressed, scan-converted and then displayed as an image of the anatomy being scanned.

High frame-rate systems are desirable for present-day two- dimensional (2D) imaging and necessary for future real-time three- dimensional (3D) imaging. The frame rate of medical ultrasound imaging systems is determined by the number of transmit events necessary per frame. In conventional ultrasound imaging systems a transmit event is a focused beam transmitted in a particular direction or at a particular focal position.

Frame rate in medical ultrasound imaging is a valuable resource. With increased frame rate, larger regions (as in color flow or three-dimensional imaging) or faster objects (heart) can be imaged. Image enhancement methods such as video integration (noise reduction) or compounding (speckle reduction) can also use up frame rate.

In conventional medical ultrasound imaging, a single pulse is transmitted in a particular direction and the reflected echoes are coherently summed to form a single line in the image frame. The amount of time necessary to form such scan line is determined largely by the round-trip transit time of the ultrasonic pulse. Many scan lines are present in an image frame to densely sample the anatomical region of interest. Thus, the frame rate in conventional medical ultrasound imaging is determined by the sound propagation speed and the size of the region of interest.

The frame rate can be improved by decreasing the number of transmit events per frame. Conventionally, this has been accomplished with a proportional reduction in the number of transmit elements used in each transmit event, resulting in poor signal-to-noise ratio (SNR).

Synthetic transmit aperture imaging has the potential to increase the present frame rate by over an order of magnitude. A method for synthetic transmit aperture imaging at a 1 kHz frame rate was proposed by Lockwood et al. in "Design of Sparse Array Imaging Systems", 1995 IEEE Ultrasonic Symp. Proc., pp. 1237–1243. Standard synthetic transmit aperture imaging, as described by Lockwood et al., is based on transmitting consecutively from different point sources, each with broad area coverage, in order to obtain point-to-point data that is subsequently beamformed. A point source comprises a single element or a group of elements phased to form a cylindrical/spherical diverging wave. Unlike conventional imaging where each image point is formed using echoes from just one transmit event, synthetic transmit aperture imaging uses echoes from several consecutive transmit events (or "transmits") that are coherently combined to form each image point. The number of transmits per image frame that can be used is limited by tissue motion and is much smaller than the number used in conventional imaging. This small number of transmits results in a very high frame rate, but it also limits the image SNR because the number of point sources cannot exceed the number of transmits. A problem to be solved is how to improve the SNR when imaging with a predetermined number of transmits and transmit elements.

SUMMARY OF THE INVENTION

The present invention is a method and apparatus for significantly increasing the SNR in synthetic transmit aperture imaging by encoding the transmit signals in orthogonal complementary codes and, in each of N transmits, firing the N point sources simultaneously.

Binary complementary pairs (Golay) of sequences are used for increasing SNR without incurring undesirable range lobes. In order to obtain point-to-point data from N transmit positions, 2N transmits are necessary. If the code length is L, then the SNR improvement per transmit obtained by using Golay sequences is $\sqrt{2L}/2N=(1/N)\sqrt{L/2}$ when compared to using an uncoded pulse.

In the present invention, orthogonal complementary sets of sequences are used to achieve SNR improvement per transmit of $\sqrt{LN}/N=\sqrt{L/N}$. This factor of $\sqrt{2N}$ improvement in efficiency over using binary complementary pairs is due to the simultaneous transmission on all transmit elements versus sequential transmission when using Golay pairs. The N orthogonal complementary sets (each containing N sequences) are used in N simultaneous transmissions of N code sequences from N transmit elements. At any given receive element, the resulting echo data from each of the N transmit events is correlated with its respective code and summed to form the decoded data for each transmit element. Thus, $N^2$ correlations are needed to perform the decoding.

Since correlations are computationally expensive, it is desirable to reduce the number of correlations needed for decoding orthogonal complementary sets for medical ultrasound imaging. In a preferred embodiment, a Hadamard construct of the orthogonal complementary sets, which requires only 2N correlations for decoding, is used.

Temporal codes have the problem of a nearfield deadzone which is equal to half the length of the coded pulse. To avoid this problem, the present invention divides the imaging depth into several zones and employs code lengths that increase with depth. In a preferred embodiment, no coding is used in the nearfield, a relatively short code is used in the mid-field and a relatively long code is used in the farfield where SNR gain is most needed. The size of the virtual point source also increases from shallow to deep zones for further SNR gain without compromising quality of the point source.

DETAILED DESCRIPTION OF THE PREFERRED EMBODIMENTS

Figure 1:
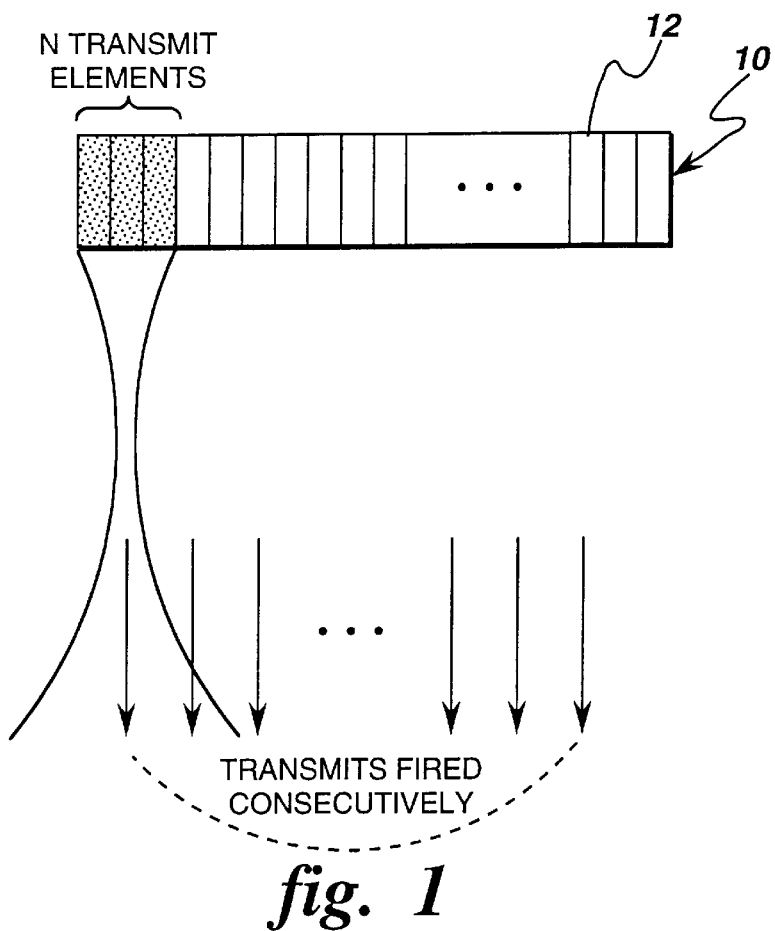
FIG. 1 is a schematic illustration of a transducer array having a shifting aperture formed by N transmit elements, each aperture transmitting a focused beam in accordance with conventional ultrasound data acquisition.

FIG. 1 depicts a conventional ultrasound array 10 of separately driven transducer elements 12 in which the transmit aperture is shifted across the array, each transmit aperture having N transmit elements (shown stippled) fired in parallel to form a focused transmit. The transmit beam is scanned across the field of view (FOV) over many transmit events to generate a single frame. At the edges of the array, the transmit aperture may have less than N transmit elements. The number of transmit elements N is determined by the transmit F-number specified and the transmit focal depth. The receive aperture includes M elements preferably centered at the center of the transmit aperture. The number of receive elements M is determined by the receive F-number specified and the imaging depth.

Figure 2:
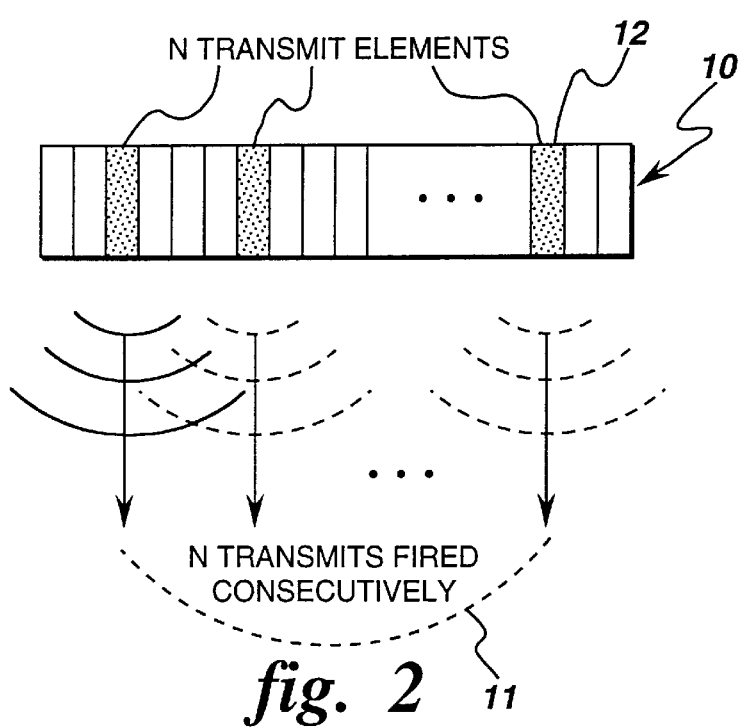
FIG. 2 is a schematic illustration of a transducer array which is pulsed to perform synthetic transmit aperture imaging without codes.

The method for synthetic transmit aperture imaging at a 1kHz frame rate proposed by Lockwood et al., supra, is based on transmitting consecutively from different point sources, each with broad area coverage, in order to obtain point-to-point data that are subsequently beamformed. This is illustrated in FIG. 2. A point source comprises a single element 12 or group of elements, phased to form a cylindrical/spherical diverging wave 11. Synthetic transmit aperture imaging coherently combines echoes from several consecutive transmits (shown stippled) to form each image point. The number of transmits per image frame that can be used is limited by tissue motion, and results in a very high frame rate, but with limited image SNR because the number of point sources cannot exceed the number of transmits.

Figure 4:
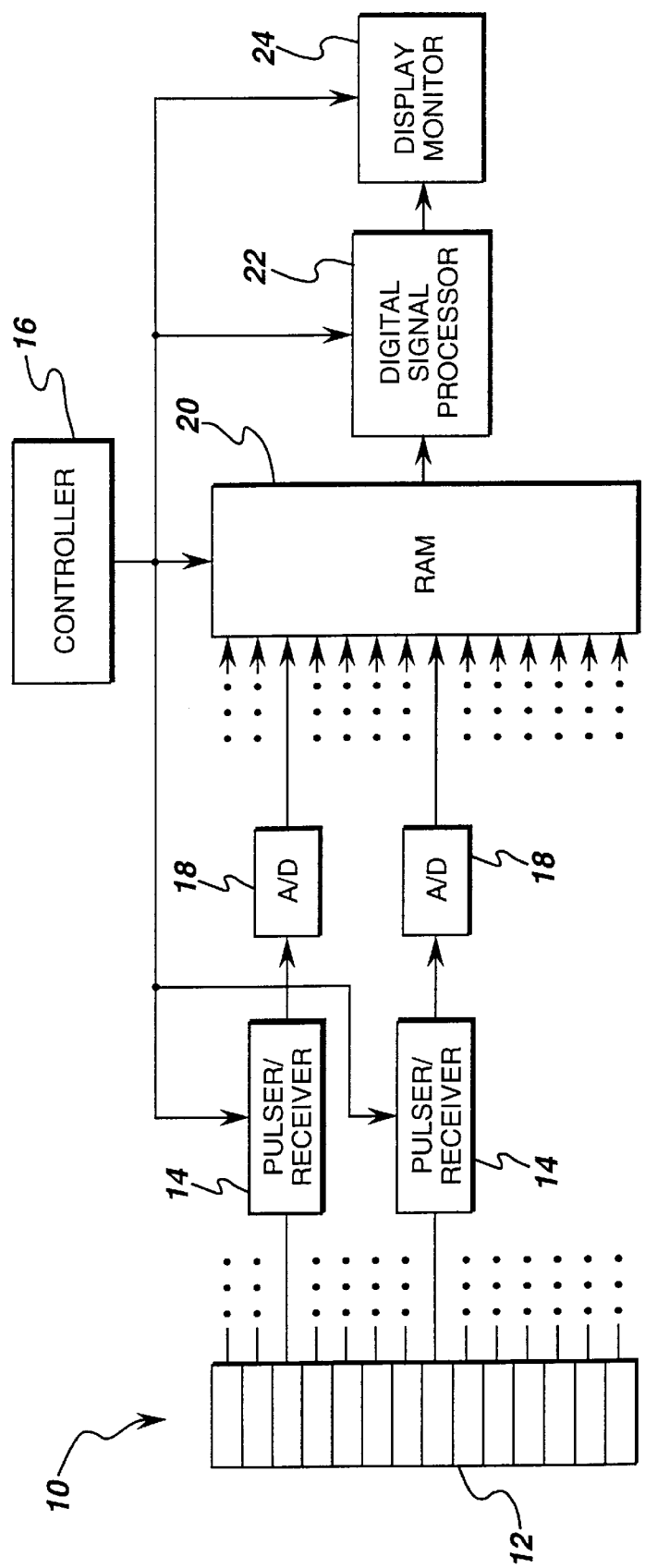
FIG. 4 is a block diagram of a digital ultrasound imaging system in accordance with the present invention.

The ultrasonic imaging system incorporating the invention, as shown in FIG. 4, includes a transducer array 10 comprised of separately driven transducer elements 12, each of which produces a burst of ultrasonic energy when energized by a pulsed waveform produced by a respective pulser/receiver 14 (only two of which are shown). The ultrasonic energy reflected back to transducer array 10 from the object under study is converted to an electrical signal by each receiving transducer element and applied separately to a respective pulser/receiver 14. The pulser/receivers 14 are operated under control of a digital controller 16 responsive to commands by a human operator.

If there are N transmit elements in an array 10 of L≧N transducer elements, the N elements are simultaneously activated to transmit unfocused ultrasound waves during each one of the N transmit events. For each transmit event, a different set of N code sequences is applied to the N pulser/receivers by controller 16 to drive the transmit elements.

For each transmit event n, n=1, 2, . . . N, the backscattered ultrasound signal $R_{nm}(t)$ at each receive element m, m=1, 2, . . . , M, is transduced into an electrical signal. These electrical signals are amplified and transmitted to respective analog-to-digital converters 18 by the respective pulser/receivers 14. For each transmit event, the digitized signals are stored in a random access memory 20 under the control of controller 16. Upon completion of the N transmit events corresponding to one image frame, the data stored in RAM 20 are retrieved and transformed, i.e., decoded, into another data set $D_{nm}(t)$ by a digital signal processor 22, which also performs beamforming on the decoded im ag e data. The decoded and beamformed image data are displayed on a video monitor 24 as a single image frame.

Significant SNR gain, in ultrasonic imaging, is achieved by using orthogonal complementary sequences. A set of N sequences $$A_i = [a_{i1}, a_{i2}, \ldots, a_{iL}] \tag{1}$$

where i=1, 2, . . . , N, is a complementary set if the sum of the auto-correlations of the N sequences is zero except at zero lag, where it is NL, as given by $$x(k) = \sum_{i=1}^{N} \sum_{j=1}^{L-k} a_{ik} a^*_{i,j+k} = NL\delta(k) \tag{2}$$

where k=0, 1, . . . , L−1, the superscript "*" denotes complex conjugation and (k) is the Kronecker delta function given by $$\delta(k) = \begin{cases} 1, \text{ for } k = 0 \\ 0, \text{ otherwise} \end{cases}$$

If the N complementary sequences are transmitted sequentially from a given transmit position and the echoes from each transmit are recorded at a given receive element, then perfect pulse compression can be achieved with no range lobes by computing the sum of the N received data sequences cross-correlated with the N respective transmitted sequences. Golay complementary pairs are a special case with biphase elements (+1, −1) and N=2. However, use of N transmits per transmit position is generally not acceptable given the limited number of transmits possible. This factor of N increase in the number of transmits can be eliminated by using orthogonal complementary sequences.

Given N sequences in a complementary set, there are N sets that are mutually orthogonal, which means that the sum of cross-correlations between corresponding sequences in any two sets {A, B} is zero at every lag:

$$x(k) = \sum_{i=1}^{N} \sum_{j=1}^{L-k} a_{ik} b_{i,j+k}^* = 0 \tag{3}$$

where k=0, 1, . . . , L−1. Physically, this means that the N mutually orthogonal complementary sets can be simultaneously transmitted at N transmit positions without any mutual interference at the receive positions after decoding, which allows achievement of one transmit per transmit position. Methods for generating orthogonal complementary sequences are well known. See, e.g., Tseng, "Signal Multiplexing in Surface-Wave Delay Lines Using Orthogonal Pairs of Golay's Complementary Sequences," IEEE Trans. Son. Ultrason., Vol. SU-18, pp. 103–107, April 1971; Tseng et al., "Complementary Sets of Sequences," IEEE Trans. Info. Theory, Vol. IT-18, pp. 644–652, Sep. 1972; Frank, "Polyphase Complementary Codes," IEEE Trans. Info. Theory, Vol. IT-26, pp. 641–647, November 1980; and Sivaswamy, "Multiphase Complementary Codes," IEEE Trans. Info. Theory, Vol. IT-24, pp. 546–552, September 1978.

Figure 3:
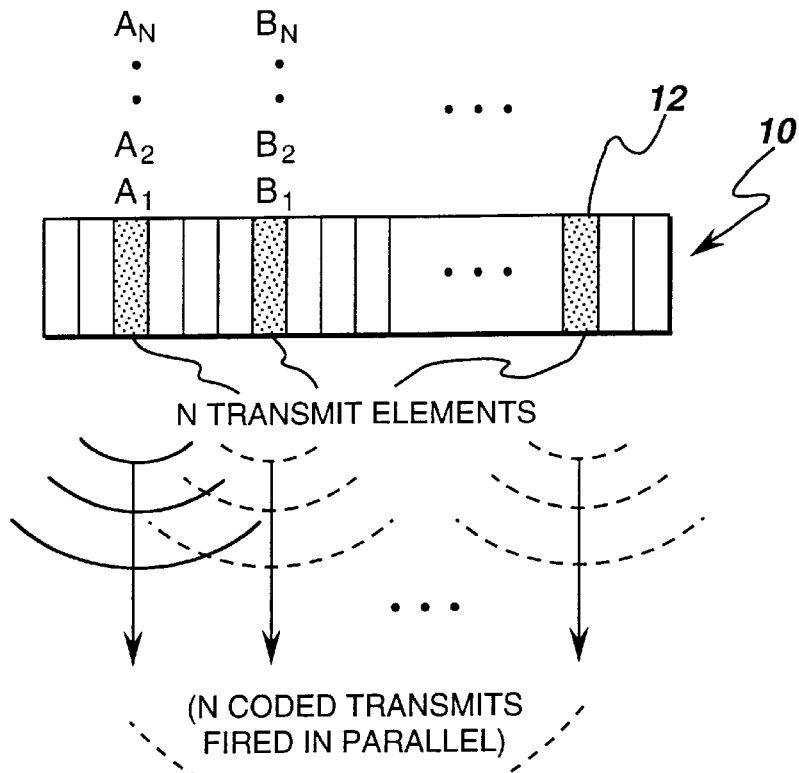
FIG. 3 is a schematic illustration of a transducer array which is pulsed to perform synthetic transmit aperture imaging using orthogonal complementary sets in accordance with the present invention.

The disclosed method, as shown in FIG. 3, may be illustrated by the following simple example of transmitting at four possible positions (N=4) using four binary orthogonal complementary sets of sequences of length 2 (L=2). The group of four orthogonal complementary sets {A,B,C,D} is as follows:

$A_1=[1,1], A_2=[1,1], A_3=[1,-1], A_4=[1,-1]$ $B_1=[1,-1], B_2=[1,-1], B_3=[1,+1], B_4=[1,1]$ $C_1=[1,1], C_2=[-1,-1], C_3=[1,-1], C_4=[-1,1] \tag{4}$ $D_1=[1,-1], D_2=[-1,1], D_3=[1,+1], D_4=[-1,-1]$ First, the four codes $\{A_1,B_1,C_1,D_1\}$ are transmitted at the four transmit positions, respectively, and the return echoes are digitized at each of the receive positions. This is followed, sequentially, by transmission of each of the remaining three groups of four codes $\{A_i,B_i,C_i,D_i, i=2,3,4\}$ and recording of the resulting echoes for each transmit. At any given receive position, the signal from a particular transmit position can be compressed and isolated from the other transmit positions by summing the cross-correlation between each of the received sequences with the corresponding sequence transmitted from that particular transmit position. For example, the following equation is used to recover the echoes R due to transmit position A:

$$R = \sum_{j=1}^{4} R_j \otimes A_j \tag{5}$$

where $\{R_j, j=1,2,3,4\}$ are the four echo sequences received at the particular receiver and "⊕" denotes cross-correlation. The echo from a single point reflector due to the pulse transmitted from position A will compress to [0,8,0], while echoes from the other three transmit positions will compress to [0,0,0]. The SNR gain over the same number of uncoded pulse transmits is $\sqrt{LN}$=2.83 or $20\log_{10}(2.83)$=9 dB. Much larger SNR gain may be expected for longer codes. In practice, each code element is represented by a modulated pulse for transmission and correlation.

The orthogonal complementary sets used in a preferred embodiment of the invention are constructed from an orthogonal complementary pair and a Hadamard matrix. An N×N matrix GN with elements $G_{ij}$ to index orthogonal complementary sets of order N is used, where i indexes the N code sequences in a set and j indexes the N different sets. Thus, each column of the GN matrix indexes a complementary set such that the sum of autocorrelations of the N sequences within that set is a Kronecker delta function, and pairs of columns are mutually orthogonal sets such that the sum of cross-correlations between the respective N sequences of the two sets is zero. Preferably, N is a power of 2, although complementary sets with other orders are also possible.

Orthogonal complementary sets of order N>2 may be constructed from an orthogonal complementary pair (N=2) by forming the Kronecker product between $G_2$ and the Hadamard matrix $H_{N/2}$ of dimension N/2:

$$G_N = G_2 \Theta H_{N/2} \tag{6}$$

where Θ denotes the Kronecker product.

For example, an orthogonal complementary pair with sequence length L=2 is given by $G_{11}=[1,1], G_{12}=[-1,1], G_{21}=[1,-1], G_{22}=[-1,-1] \tag{7}$ To construct an orthogonal complementary set with N=4, the following Hadamard matrix of dimension 2 is used:

$$H_2 = \begin{bmatrix} 1 & 1 \\ 1 & -1 \end{bmatrix} \tag{8}$$

Four mutually orthogonal sets (each with four sequences of length L=2) are given by the columns of $G_4$ obtained by using Eqs. (7) and $$G_4 = \begin{bmatrix} G_{11} & G_{12} & G_{11} & G_{12} \\ G_{21} & G_{22} & G_{21} & G_{22} \\ G_{11} & G_{12} & -G_{11} & -G_{12} \\ G_{21} & G_{22} & -G_{21} & -G_{22} \end{bmatrix} \tag{9}$$

The data acquisition for synthetic transmit aperture imaging involves transmitting the code indexed in each row of the GN matrix from N transmit elements. Thus, each column of the GN matrix corresponds to a particular transmitter element position, while each row corresponds to a separate firing. Continuing the previous N=4 example (see Eq. (9)), on the first firing (F1), element positions 1 and 3 transmit $G_{11}=[1,1]$ while element positions 2 and 4 transmit $G_{12}=[1,1]$. On the second firing (F2), element positions 1 and 3 transmit $G_{21}=[1,-1]$, while element positions 2 and 4 transmit $G_{22}=[1,-1]$, and so on until firing F4.

Although the received signal is a superposition of the reflected signals from all of the transmitters (i.e., transmitter elements), the decoding process serves to isolate the reflected signal from each of the transmitters (by virtue of the code orthogonality) and to increase the SNR by 10logLN dB over standard synthetic transmit aperture imaging, where L is the length of the code sequence and N is the number of transmitters.

The benefit of using this Hadamard construct over using any other orthogonal complementary sets is that the decoding for the Hadamard construct may be performed using 2N correlations instead of $N^2$ correlations. While the given Hadamard construct orthogonal complementary set may be decoded using the conventional correlation method, computational saving is achieved by breaking the overall decoding into a Hadamard decoding step and a Golay decoding step. The Hadamard decoding step separates the N transmitting elements into N/2 pairs and uses only summations. Subsequently, each of the N/2 pairs of transmitters are separated into individual transmitters using the conventional method to decode orthogonal Golay pairs. Since each orthogonal pair is decoded using four correlations, 2N total correlations are performed in this manner.

Figure 6:
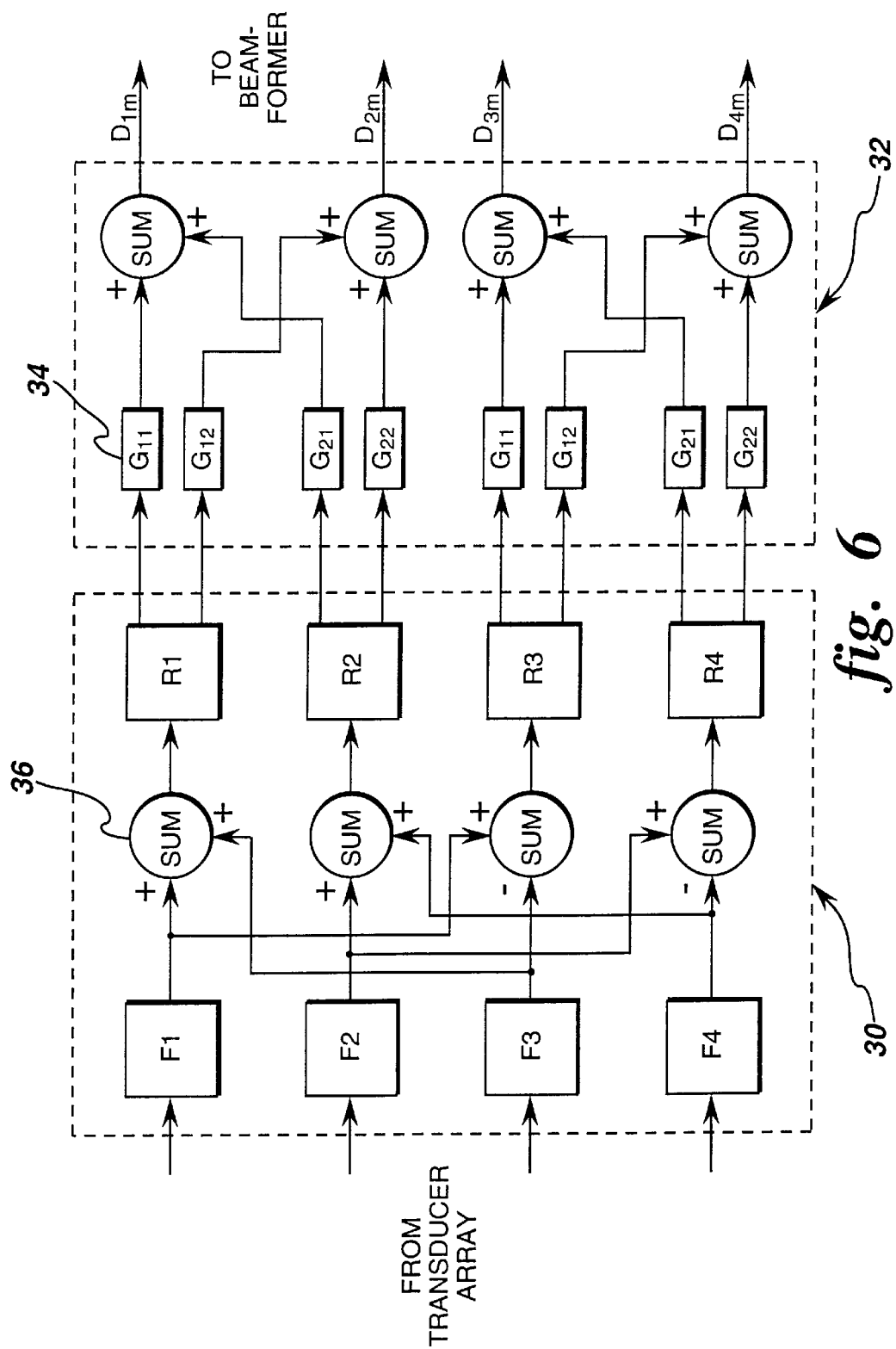
FIG. 6 is a block diagram of the subsystem (which forms part of digital signal processor 22 in FIG. 4) for performing separate steps of Hadamard and Golay decoding in accordance with a preferred embodiment of the invention.

FIG. 6 illustrates the method of operation of the invention wherein Hadamard decoding for the N=4 example is performed as follows:

R1=F1+F3

R2=F2+F4

R3=F1−F3

R4=F2−F4 where F1–F4 are the received signals from firings 1–4 stored in memory 20 (see FIG. 4) and R1–R4 perform the summations using summers 36. Thus it can be seen that R1 and R2 have contributions from only transmitters 1 and 2, while R3 and R4 have contributions from only transmitters 3 and 4, meaning that the Hadamard decoding 30 has isolated the transmitters into two pairs. Additionally, the Golay decoding 32 (FIG. 6) isolates each transmitter and completes the overall decoding:

$D_{1m}=R1 \oplus G_{11}+R2 \oplus G_{21}$ $D_{2m}=R2 \oplus G_{12}+R2 \oplus G_{22}$ $D_{3m}=R3 \oplus G_{11}+R4 \oplus G_{21}$ $D_{4m}=R3 \oplus G_{12}+R4 \oplus G_{22}$ where $\oplus$ denotes cross-correlation. Each of correlation blocks 34 is preferably a Finite Impulse Response filter which performs the correlation:

$$x(m) \overline{* y(-m)} = \sum_n x(n+m)\overline{y(n)} \tag{10}$$

where * denotes convolution and the overbar denotes conjugation (if x and y are complex). The results of the correlations are summed to form the decoded signals $D_{nm}$ corresponding to transmit positions n=1, 2, 3, 4 and receive elements m=1, 2, . . . , M, which are then beamformed by digital signal processor 22 (see FIG. 4).

Figure 5:
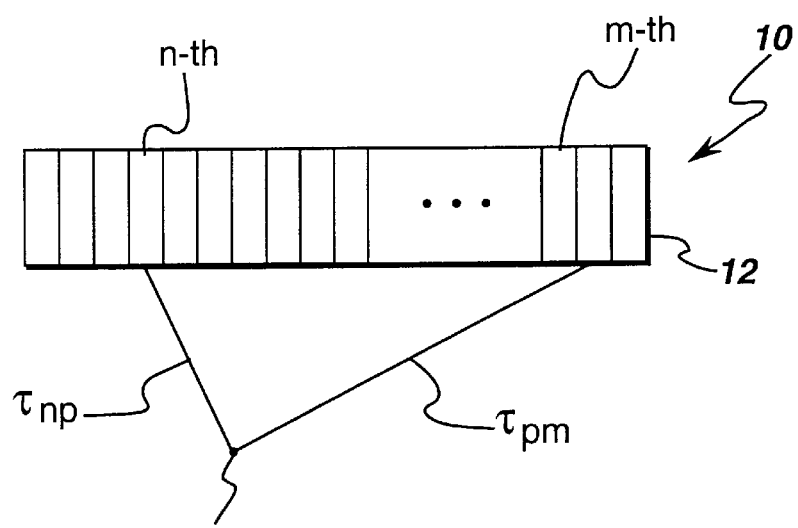
FIG. 5 is a schematic illustration of the paths of transmission and scattering for an ultrasound wave transmitted by the n-th transmit element, scattered by a scatterer located at position p, and received by the m-th receive element.

The decoded data set $D_{nm}(t)$ can be beamformed to produce a confocal image. As indicated in FIG. 5, the decoded data for each position p is beamformed in accordance with the formula:

$$B(p) = \sum_{m=1}^{M}\sum_{n=1}^{N} a_{nm}D_{nm}(t - \tau_{np} - \tau_{pm}) \tag{11}$$

where $\tau_{np}$ is the time for the transmitted pulse to propagate from the n-th transmit element to position p; $\tau_{pm}$ is the time for the scattered pulse to propagate from position p to the m-th receive element; and $a_{nm}$ is the apodization function for the n-th transmit element and the m-th receive element.

While only certain preferred features of the invention have been illustrated and described, many modifications and changes will occur to those skilled in the art. It is, therefore, to be understood that the appended claims are intended to cover all such modifications and changes as fall within the true spirit of the invention.

We claim:

1. A system for imaging ultrasound scatterers, comprising:

an ultrasound transducer array including a multiplicity of transducer elements for transmitting ultrasound waves and detecting ultrasound echoes reflected by said ultrasound scatterers;

transmit means coupled to said transducer array for pulsing a first number N of transducer elements, for N transmit events, with signals derived from N orthogonal complementary code sets, each of said code sets comprising N complementary code sequences;

receive means coupled to said transducer array for receiving signals from a second number M of transducer elements of said multiplicity following each of said N transmit events, each set of signals received at said M transducer elements representing a respective received data sequence;

analog-to-digital conversion means for converting each of the N×M received signals into a respective digital signal;

means for decoding the N×M digital signals by computing the sum of the N received data sequences cross-correlated with the N orthogonal complementary code sequences transmitted from each respective one of said N transducer elements to form a decoded data set for said each respective one of said N transducer elements;

beamforming means for forming a beamformed data set from the decoded data sets; and means (24) for displaying an image that is a function of said beamformed data set.

2. The system of claim 1, wherein said N orthogonal complementary code sequences are derived from an orthogonal complementary pair and a Hadamard matrix.

3. The system of claim 2, wherein said decoding means comprises means for Hadamard decoding and means for Golay decoding.

4. The system of claim 3, wherein said Hadamard decoding means comprise a summer.

5. The system of claim 3, wherein said Golay decoding means comprise a Finite Impulse Response filter.

6. The system of claim 1 wherein said transmit means is adapted to impart a delay to signals provided to said transducer elements, such that the transducer elements of said array can emulate a point source.

7. The system of claim 6, wherein said N orthogonal complementary code sequences are derived from an orthogonal complementary pair and a Hadamard matrix.

8. The system of claim 7, wherein said decoding means comprises means (30) for Hadamard decoding and means for Golay decoding.

9. The system of claim 8, wherein said Hadamard decoding means comprise a summer.

10. The system of claim 8, wherein said Golay decoding means comprise a Finite Impulse Response filter.

11. A method for acquiring ultrasound scattering data, comprising the steps of:

driving a first number N of transducer elements of a multiplicity of transducer elements in an array, for N transmit events, with pulses derived from N orthogonal complementary code sets, each of said code sets comprising N complementary code sequences, said driving of N transducer elements being performed once for each respective one of said N orthogonal complementary code sequences within each of said code sets;

receiving signals from a second number M of transducer elements of said multiplicity following each of said N transmit events, each set of signals received at said M transducer elements representing a respective received data sequence;

converting each of the N×M received signals into a respective digital signal;

decoding the N×M digital signals by computing the sum of the N received data sequences cross-correlated with the N orthogonal complementary code sequences transmitted from each respective one of said N transducer elements to form a decoded data set for said each respective one of said N transducer elements; and forming a beamformed data set from the decoded data sets.

12. The method of claim 11, wherein said N orthogonal complementary code sequences are derived from an orthogonal complementary pair and a Hadamard matrix.

13. The method of claim 12, wherein the decoding step comprises the steps of Hadamard decoding followed by Golay decoding.

14. The method of claim 11, further comprising the step of displaying an image which is a function of said beamformed data set.

15. A method for imaging ultrasound scatterers in a field of view, comprising the steps of:

driving a first set of transducer elements of a multiplicity of transducer elements in a transducer array, during each one of a first plurality of transmit events, with pulses derived from a first set of orthogonal complementary code sequences having a first length, each transmit event of said first plurality comprising driving said first set of transducer elements with a respective one of said first set of orthogonal complementary code sequences;

receiving signals from a second set of transducer elements following each of said transmit events of said first plurality to form a first received data set of received data sequences corresponding to ultrasound scatterers located at a first range of depth relative to the transducer array;

converting each of said received data sequences of said first received data set into a respective digital signal to form a first set of digital signals;

decoding said first set of digital signals by computing the sum of the received data sequences of said first received data set cross-correlated with the respective orthogonal complementary code sequences of said first set of orthogonal complementary code sequences to form a first decoded data set for each one of said first set of transducer elements;

forming a first beamformed data set from the first decoded data sets; and displaying a first image which is a function of said first beamformed data sets.

16. The method of claim 15, further comprising the steps of:

driving a third set of transducer elements of said multiplicity during each one of a second plurality of transmit events, with pulses derived from a second set of orthogonal complementary code sequences having a second length greater than said first length, each transmit event of said second plurality comprising driving said third set of transducer elements with a respective one of said second set of orthogonal complementary code sequences;

receiving signals from a fourth set of transducer elements following each of said transmit events of said second plurality to form a second received data set of received data sequences corresponding to ultrasound scatterers located at a second range of depths relative to the transducer array, the depths of said second range being greater than the depths of said first range;

converting each of said received data sequences of said second received data set into a respective digital signal to form a second set of digital signals;

decoding said second set of digital signals by computing the sum of the received data sequences of said second received data set cross-correlated with the respective orthogonal complementary code sequences of said second set of orthogonal complementary code sequences to form a second decoded data set for each one of said third set of transducer elements;

forming a second beamformed data set from the second decoded data sets; and concurrently with display of said first image, displaying a second image which is a function of said second beamformed data sets.

17. The method of claim 15, wherein the decoding step comprises the steps of Hadamard decoding followed by Golay decoding.

* * * * *